UNITED STATES PATENT OFFICE.

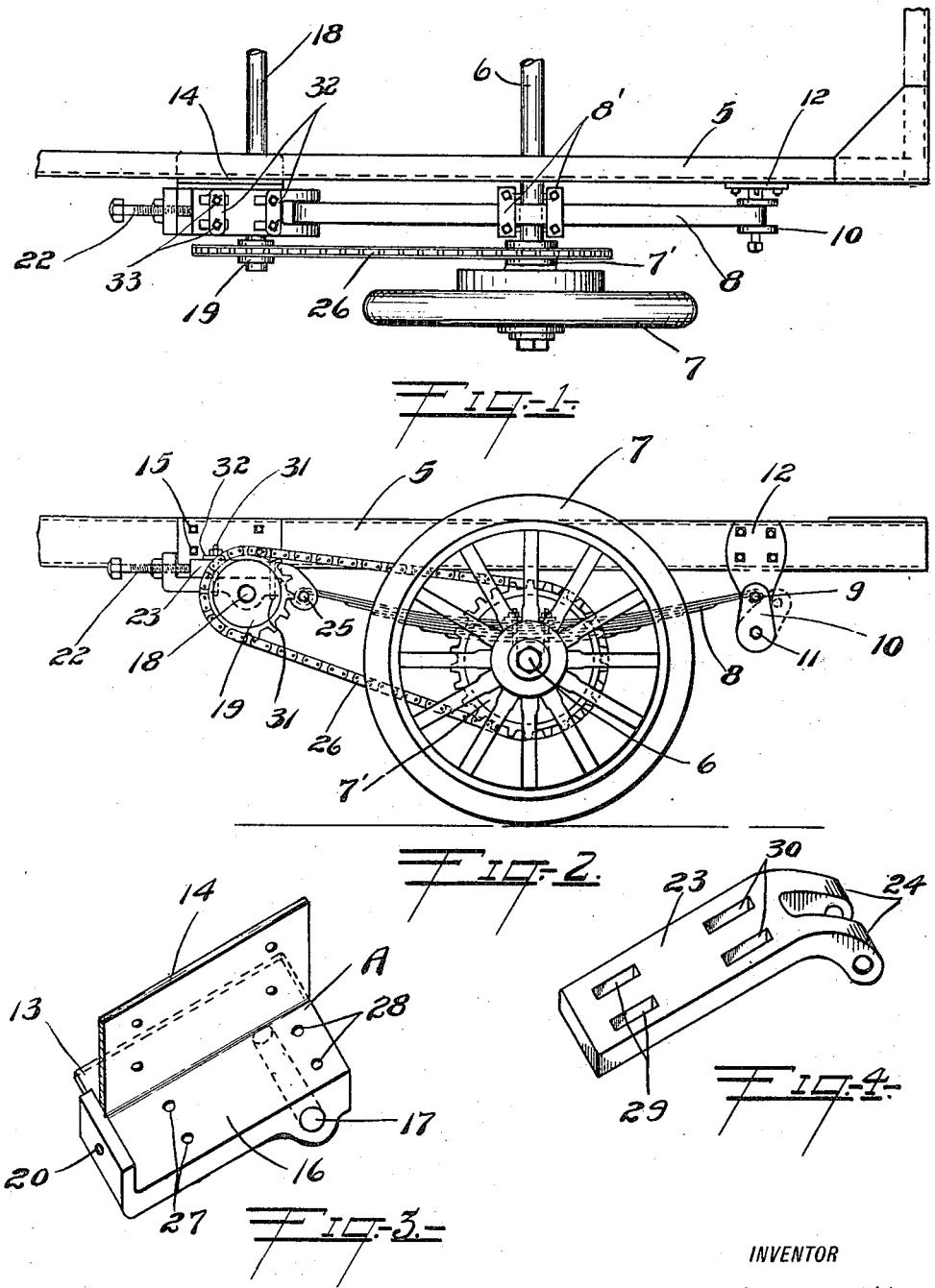

HOWARD P. WOODWORTH, OF BAY CITY, MICHIGAN.

DRIVE FOR MOTOR-VEHICLES.

1,269,034.  Specification of Letters Patent.  Patented June 11, 1918.

Application filed May 4, 1917. Serial No. 166,402.

*To all whom it may concern:*

Be it known that I, HOWARD P. WOODWORTH, a citizen of the United States of America, residing at Bay City, in the county of Bay and State of Michigan, have invented certain new and useful Improvements in Drives for Motor-Vehicles, of which the following is a specification.

This invention relates to drives for motor vehicles and the like.

One object is to provide a chain motor drive for automobiles wherein the chain can be easily and quickly adjusted.

Another object resides in the provision of a drive of the nature stated embodying among other characteristics a structure whereby the radius rods now in common use are eliminated.

With the above and other objects in view, the present invention consists in the combination and arrangement of parts hereinafter more fully described, illustrated in the accompanying drawings and particularly pointed out in the appended claims, it being understood that changes may be made in the form, size, proportion and minor details without departing from the spirit or sacrificing any of the advantages of the invention.

In the drawings:

Figure 1 is a fragmentary plan view of a motor or other chassis illustrating my invention;

Fig. 2 is a side elevation;

Fig. 3 is a detail perspective view of the bracket in which the jack shaft is journaled and on which the adjusting means for the chain drive is mounted; and Fig. 4 is a detail perspective view of a part of the adjusting means.

Referring now more particularly to the accompanying drawings, the reference character 5 indicates a portion of a motor vehicle or other chassis, especially the rear part thereof, 6 indicating the rear axle and 7 one of the rear drive wheels. The numeral 8 indicates a common type of leaf spring, the rear end of which is connected at 9 to a shackle 10, pivoted at 11, on a bracket 12 secured to the side of the chassis 5 at the rear thereof. Clips 8' secure the the spring intemediate its ends to the rear axle and on the wheel or axle adjacent the wheel is fixed a sprocket wheel 7'.

A bracket A is secured to the side of the chassis 5 in any suitable manner. This bracket A includes securing flanges 13 and 14 arranged at right angles to each other. The flange 13 extends under the side of the chassis 5 while the flange 14 fits over the side of the chassis 5 and is bolted thereto as indicated at 15. Extending laterally from these securing flanges 13—14 is a bed 16 provided with a bearing 17 adapted to receive the jack shaft 18 which projects beyond the outer edge of the bed 16 and on which projecting end is disposed a sprocket wheel 19.

A flange 20 is formed at the forward end of the bed 16 and has a threaded aperture 21 to receive a threaded bolt 22 adapted to bear against the forward end of an adjusting plate 23 slidable on the bed 16 and to which adjusting plate the forward end of the aforesaid spring 8 is secured. For instance, said plate 23 has its rear end provided with downwardly directed perforated ears 24 between which the forward end of the spring 8 is secured by a pin 25, whereby movement of the plate 23 rearwardly results in an increase in the distance between the centers of the two aforesaid sprocket wheels 7' and 19 and adjusts the drive chain 26 which connects the said sprocket wheels. These adjustments are effected by manipulation of the aforesaid threaded bolt 22.

To hold the adjusting plate 23 in adjusted position on the bed 16 the latter is provided with pairs of apertures 27 and 28 which coincide with pairs of slots 29 and 30 in the plate and through which apertures and slots U-bolts 31 are passed. Clips 32 connect the legs of the U-bolts and are clamped against the plate 23 by nuts 33, which latter, when loosened, permit easy and ready sliding movement of the plate 23 by the operating bolt 22, as should now be well understood.

It will be understood that while I have described and illustrated but one side of a motor driven machine, that both sides are provided with the same device as that shown and described. It is believed that the present illustration and description will be sufficient to enable those skilled in the art to readily comprehend my invention.

What is claimed is:

1. In a vehicle, the combination of a frame, an axle, a drive wheel on the axle, a spring having the axle mounted thereon, a shackle connection between one end of said spring and the frame, a bracket secured to the frame, a drive member mounted in said bracket, a drive chain forming connecting means between the drive member and drive wheel, a plate slidable on the said bracket and having the opposite end of the spring connected thereto, means for adjusting the plate on the bracket, and means for securing the plate to the bracket in the required adjusted position.

2. In a device of the character described, a chassis, a rear axle, a drive wheel mounted on said axle, a sprocket wheel concentric with said axle and fixed with relation to the first mentioned wheel, a bracket secured to the chassis, a shackle pivoted on said bracket, a second bracket on the chassis, a jack shaft journaled in the second mentioned bracket, a plate slidable on said second mentioned bracket, a spring secured intermediate its ends to said axle and secured at its ends to said shackle and said plate, a sprocket wheel on said jack shaft, a chain drive connection between said sprocket wheels, and means to slide said plate so as to increase the distance between the centers of the two aforesaid sprocket wheels and thereby adjust the drive chain.

3. In a device of the character described, a chassis, a rear axle, a drive wheel on the axle, a sprocket wheel fixed to the drive wheel, a bracket in the rear of the drive wheel, a shackle mounted on said bracket, a spring secured intermediate its ends to the axle and at its rear end connected to said shackle, a second bracket mounted on the chassis in advance of the drive wheel, said bracket including a bed portion provided with an upturned flange having a screw threaded aperture therein, a plate mounted for adjustment on said bed and at its rear end having downwardly directed ears, the forward end of said spring being mounted in said ears of said adjustable plate, a jack shaft journaled in the second mentioned bracket, a sprocket wheel on said jack shaft, a drive chain connecting said sprocket wheels, and a screw bolt mounted in the screw threaded aperture of the upturned flange of the bed of the second mentioned bracket to move said plate rearwardly and thereby increase the distance between the centers of said sprocket wheels and adjust the drive chain.

In testimony whereof I affix my signature.

HOWARD P. WOODWORTH.